Figure 1:
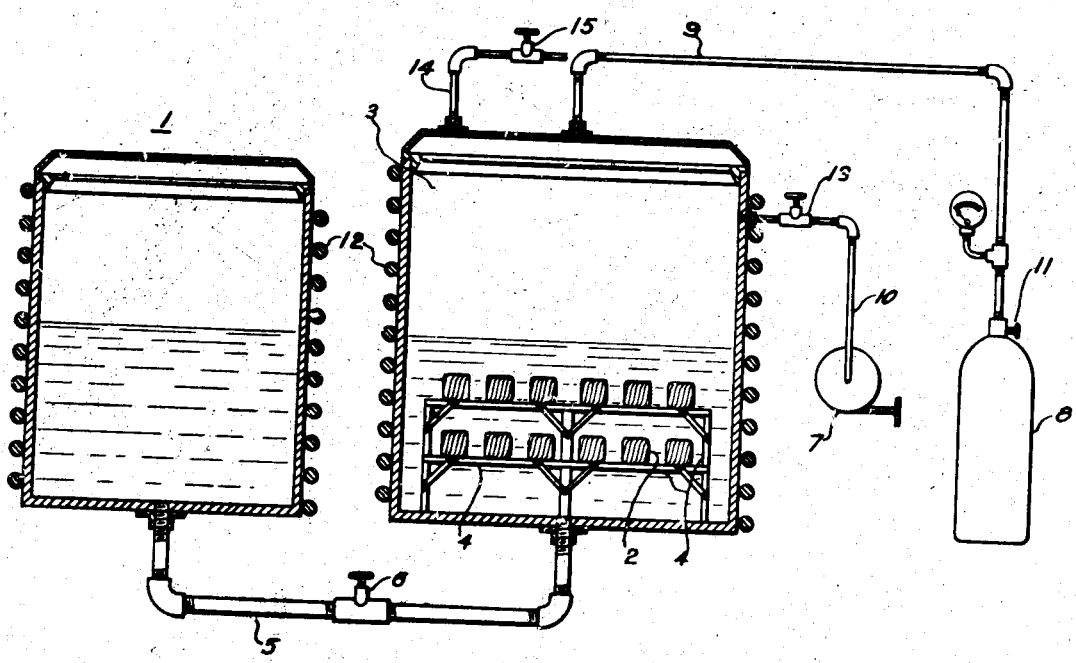

March 8, 1932.  J. T. GOFF  1,848,344
METHOD OF IMPREGNATING ELECTRICAL CONDUCTOR INSULATIONS
Filed Sept. 22, 1930

INVENTOR
James T. Goff
BY
ATTORNEY

Patented Mar. 8, 1932

1,848,344

UNITED STATES PATENT OFFICE

JAMES T. GOFF, OF WILKINSBURG, PENNSYLVANIA, ASSIGNOR TO WESTINGHOUSE ELECTRIC & MANUFACTURING COMPANY, A CORPORATION OF PENNSYLVANIA

METHOD OF IMPREGNATING ELECTRICAL-CONDUCTOR INSULATIONS

Application filed September 22, 1930. Serial No. 483,467.

My invention relates to methods of insulating electrical apparatus and more particularly to methods of insulating coils.

The principal object of my invention is to provide an improved method of insulating electrical apparatus, such as coils, which comprises coating insulated coils or impregnating fibrous material covering the coils with a solution of a gum in a vegetable drying oil.

Another object of my invention is to provide a process of insulating electrical conductors, such as coils, which comprises wrapping a cellulosic or fibrous material around the coils and impregnating the same with a solution of a gum in a vegetable drying oil under pressure in a non-oxidizing atmosphere.

A further object of my invention is to provide a process of insulating coils for electrical apparatus which comprises wrapping cotton tape around the coils, removing the moisture and air, and then impregnating the same with a solution of a gum in a vegetable drying oil in an inert atmosphere, such as carbon dioxide.

It has heretofore been the practice, in insulating electrical apparatus, such as coils, to first insulate a plurality of conductors, or the turns of the windings of a coil, from each other by means of an insulating varnish or by fibrous insulation, such as cotton or asbestos.

In coils in which the windings are comparatively large, as in the field coils of railway motors and the larger magnetic coils, the conductors or windings were usually insulated from each other by a suitable fibrous insulation, such as asbestos or cotton tape. The windings or conductors were then assembled, and a strip of cotton tape was helically wound around the conductors to form the windings of the coil and the assembled apparatus was baked in vacuum to remove the moisture.

The assembled coil, wrapped with the stripping tape, was next impregnated with a liquid gum such as asphalt, under pressure, for the purpose of filling the spaces between the insulated coils. It is essential that the spaces be filled as completely as possible to provide means for conducting the heat from the coil, and so that a film of sufficient thickness shall be formed to resist moisture and chemicals, such as salt spray or acid fumes.

The cotton tape was then removed, with the excess gum, several layers of varnished cambric cloth where wrapped around the impregnated coil and a layer of cotton tape was applied over the cambric cloth. After the coils and insulation were thus assembled, it was found necessary to apply several coatings of varnish in order the produce a coil having a good appearance and to provide satisfactory moisture and chemical resistance.

In smaller wire-wound coils, such as magnet coils and of field coils of certain types, the windings are insulated from each other by an enamel alone, the layers or windings being separated from each other by cotton tape or yarn. In preparing such coils, it has been the practice to wrap the coil with a layer of cotton tape. A layer of stripping tape was then applied to the coils, and the insulated coil was then treated with a liquid gum. After impregnation, the stripping tape was removed to clean the surface. The coil was then buffed, immersed in a varnish and baked. It was then necessary to repeat the buffing operation, and spray several times, and bake the coil after each spraying operation.

In coils of certain types, it has also been the practice to assemble the insulated windings and immerse them in a varnish containing a volatile solvent. The coil was then baked, and varnished cambric cloth or mica tape was wrapped around the assembled coil and a final layer of cotton or asbestos tape then applied. The assembled structure was then impregnated with two or three coatings of the varnish containing the volatile solvent, the coating being baked after each application.

The foregoing methods of insulating coils are expensive and time consuming and do not produce uniformly good results. When a gum is employed as the impregnating or filling agent for the coils, it is difficult to secure satisfactory penetration, and, when certain gums, such as copal and rosin, are utilized, they expand and contract upon repeated heating and cooling to form a loose powder inside the coil. Furthermore, it is impossible to secure sufficient impregnation of the fibrous material and a sufficient filling of the interstices between the windings in a single operation, with a varnish containing a volatile solvent. On evaporation of the volatile solvent, minute voids are also formed inside the coil which decrease the heat conductivity of the insulation and decrease the resistance to moisture. Furthermore, the extent of penetration of such varnishes into the fibrous material and the coil is small, so that the coils in which varnishes containing a volatile thinner may be utilized, is very limited.

I have made the discovery that conductors, assembled in the form of coils or windings and insulated from each other by the methods previously described, may be satisfactorily impregnated by an improved process which comprises removing the moisture from the coil and then impregnating the assembled insulated coil or winding, at an elevated temperature, with a solution of a gum in a vegetable drying oil or what may be termed a varnish base, under pressure, in a nonoxidizing atmosphere, and permitting the coils to drain in a similar atmosphere.

Figure 2:
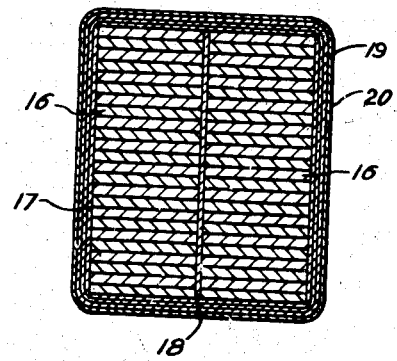

My invention will be better understood by reference to the accompanying drawings, in which Figure 1 is a cross sectional view of the impregnating apparatus, and Fig. 2 is a similar view of a field coil for railway motors.

Referring to the drawings, a varnish base comprising a solution of a gum, such as asphalt, gilsonite, rosin, copal or dammar, in a vegetable drying oil, such as linseed oil, China wood oil or perilla oil, and containing from 1% to 7% of a suitable drier, such as the linoleates of cobalt or manganese, lead borate or lead acetate, is placed in a storage or preheating tank 1, and the coils 2 to be impregnated are placed in the impregnating tank 3. Both tanks are provided with suitable heating means, such as the coils, 12. I prefer to heat the tanks by electrical energy, although gas or internal heating means, such as coils through which a heating fluid is circulated may be employed. Suitable racks 4 are provided in tank 3 to hold the coils 2 in position during the impregnating process. The tanks 1 and 2 are connected by means of a pipe 5 which is provided with a valve 6. A vacuum pump 7 and a cylinder 8, containing carbon dioxide gas, are connected to the tank 2 by means of pipes 9 and 10, respectively.

In preparing the coils to be impregnated, the windings are first assembled and insulated. For example, in field coils for railway motors, the conductors are insulated with asbestos and several layers of varnished cambric cloth, and a layer of cotton cloth is wrapped around the assembled windings. In the case of smaller coils, such as magnet coils, the windings are insulated from each other by fibrous insulation or enamel or both, and, as a rule, in smaller coils, a layer of cotton is placed between the layers of windings. One or more layers of cotton tape or varnished cambric are wrapped around the coils.

The assembled coils are then heated to a temperature of approximately 125° C. in a current of air to partially remove moisture, after which they are placed in the tank 3, which is evacuated by means of the pump 7, and the baking of the coils is continued for approximately one hour in order to completely remove any air or moisture that may be trapped in the interior of the coils, or, if desired, the entire drying process may be effected in a vacuum.

The vacuum valve 13 is then closed, the valve 6 is opened, and the coils in the tank are completely covered with the varnish base which has been preheated to a temperature of approximately 90° to 110° C., in the preheating tank 1. The valve 6 is now closed and the valve 11 is opened, and a pressure of about 80 pounds of carbon dioxide per square inch is maintained within the impregnation tank during the impregnating period, during which time the temperature is maintained at approximately 90° to 110° C. depending upon the type of varnish employed. About ½ hour to 4 hours are required to obtain the requisite impregnation, depending upon the size of the coils and the thickness of the fibrous insulation. A portion of the carbon dioxide is then allowed to escape through the vent 14, which is controlled by the valve 15, and the impregnating solution is forced back into the tank 1 by the residual carbon-dioxide pressure.

The impregnated coils are allowed to drain in the atmosphere of carbon dioxide at a temperature of 125° C. to 150° C. for a period of approximately 2 hours to 7 hours, which enables a satisfactory finish to be produced, and are finally baked in a current of air for a period of 8 hours to 16 hours at a temperature of 125° to 150° C. until the oil has oxidized, and a hard, impervious film is produced on the surface of the insulation.

It will be noted that my improved impregnating solution, which I have termed a varnish base, is a varnish in which no volatile solvent is employed. In preparing the varnish base, I prefer to utilize about 60%, by weight, of gum, although this amount may vary between 30% and 80%, by weight. If more than 80%, by weight, of gum is employed, the impregnating solution becomes to viscous to readily penetrate into the insulating material. However, if less than 30% by weight of gum is utilized, the viscosity of the impregnating solution will be too low, and, when the coils are drained after impregnation, too much of the varnish will escape, and the oxidized film, after baking, will be very uneven.

As a solvent for the gum, I preferably employ approximately 39%, by weight, of linseed oil or China wood oil in combination with linseed oil. Up to approximately 60%, by weight, of oil may be utilized, but it will be understood that, as the percentage of oil is increased, the varnish will become more susceptible to polymerization on continued heating. However, if the varnish base contains less than 39%, by weight, of oil, it is more difficult to secure complete penetration, and the moisture resistance of the impregnated coil is reduced because of incomplete filling.

The pressure of carbon dioxide will depend upon the safety limit of the impregnating tank. Satisfactory results are obtained in the impregnating operation when the concentration of carbon dioxide is maintained at from 30 pounds to 80 pounds per square inch. A pressure of less than 30 pounds per square inch is too low to furnish adequate pressure to force the varnish into, and thoroughly impregnate, the insulation. However, pressure greater than 80 pounds per square inch is not objectionable; in fact, superior impregnation will be obtained in a shorter period of time by increasing the carbon dioxide pressure.

The following example of the method of insulating railway field coils by my process will serve to illustrate and explain my invention. The coil, as shown in Fig. 2, comprises a plurality of windings assembled in two layers 16. The conductors are insulated from each other by asbestos insulation 17, and the layers are insulated from each other by a sheet of mica 18. The coils, thus assembled, are first wrapped with three layers of varnished cambric cloth 19 and then with a layer of cotton tape 20, after which, they are baked in the assembled state, at a temperature of about 125° C., for 1 hour to remove moisture. The coil is then placed in an impregnating tank 3, and the baking is continued, under vacuum pressure, for 2 hours to remove air and any residual moisture.

The valve 6 is next opened, and a sufficient amount of an impregnating solution, comprising approximately 60%, by weight, of asphalt, 18%, by weight, of China wood oil, 18%, by weight, of linseed oil and 4%, by weight, of manganese linoleate, to completely cover the coil—is permitted to pass through the pipe 5. The valve 6 is then closed, and the valve 11 is opened until a pressure of 80 pounds per square inch of carbon dioxide is obtained. This pressure is maintained for a period of about 3 hours, and the impregnating varnish kept at a temperature of about 115° C., after which the valve 6 is opened, and the impregnating solution is forced through the pipe 6, under the carbon dioxide pressure in the impregnating tank 3, thereby causing a reduction in the pressure of the carbon dioxide to 15 pounds to 25 pounds per square inch. This pressure is maintained while the excess impregnating solution is draining from the coils, and until a smooth finish is obtained. During this process, which requires approximately 3 hours, the coils are kept at a temperature of about 150° C. The coils are then removed from the impregnating tank and baked in air at a temperature of about 125° C. to 150° C. until the film is completely dried. In order to improve the finish of the coil, it may be immersed in a varnish containing a volatile solvent, and the baking operation repeated.

By my improved method, it is possible to completely impregnate a coil which has been wrapped with three to four layers of varnished cambric and an outer layer of cotton tape and to fill the interstices between the windings and the layers of fabric in one operation, whereas, in previous practice, at least three operations were required to secure the desired amount of impregnation. My improved process is, therefore, more economical than previous practice because the time of impregnation is materially reduced and less labor is involved. Furthermore, by employing an elevated temperature and a nonoxidizing atmosphere, better impregnation and more uniform results are secured. Coils impregnated by my improved method will, therefore, be more resistant to moisture, and will have better conductivity and a longer life than those impregnated by prior methods.

An inert or nonoxidizing atmosphere, such as a vacuum, carbon dioxide, nitrogen or mixtures thereof, is employed during the impregnating process so that the drying oil will not be oxidized until after the coil has been thoroughly impregnated. If desired, however, hydraulic pressure may be utilized to force the impregnating varnish in the coils. If air is present at this stage of the process, it will form a thin film or skin over the surface of the varnish, and, as the varnish base is drained from the tank, the skin will come in contact with, and injure, the finish on the coils. Furthermore, the air, coming into contact with the varnish, will prevent the proper draining of the coils.

The term "coil", as utilized in the specification and claims, is intended to include the windings of an individual conductor or a plurality of different conductors, which are assembled adjacent, or in close relationship, to each other.

While I have disclosed my invention in considerable detail and have given specific examples, it will be understood that the examples should be construed as illustrative and not by way of limitation.

For example, my process may be applied to insulating coils of many types or to conductors insulated from each other and assembled together, the assembly being wrapped with insulation of various kinds, such as asbestos or fibrous material. I have found it especially suitable for impregating armature coils in which the windings are insulated from each other by mica tape, and a layer of asbestos wound around the assembled conductors. My process may also be utilized for impregnating the stators or rotors of dynamic machinery. In such cases, a plurality of coils, properly insulated from each other are embedded in slots in the rotor or stator, and the insulation is impregnated and the interstices between the coils are filled with an insulating material by my process.

Other modifications will be apparent to those skilled in the art without departing from the spirit and scope of my invention. It is, therefore, desired that only such limitations shall be imposed as are indicated in the appended claims.

I claim as my invention:

1. The process of insulating a coil which comprises impregnating the coil with a solution of a gum in a drying oil in an atmosphere of a nonoxidizing gas.

2. The process of insulating a coil which comprises wrapping a fibrous material around the coil and impregating the wrapped coil with a solution of a gum in a vegetable drying oil in a nonoxidizing atmosphere.

3. The process of insulating a coil which comprises treating the coils with a solution of a gum in a vegetable drying oil at an elevated temperature under pressure of a nonoxidizing gas, removing the impregnating solution and draining in the nonoxidizing atmosphere.

4. The process of insulating a coil which comprises wrapping the coil with fibrous insulation, impregnating the wrapped coil with a solution of a gum in a vegetable drying oil, removing the impregnating solution and draining in a nonoxidizing atmosphere.

5. The process of insulating a coil which comprises treating the coils with a solution of a gum in a vegetable drying oil under pressure of a nonoxidizing gas, permitting the impregnating solution to drain from the coil while still maintaining a nonoxidizing atmosphere, and completing the drying of the conductors in air.

6. The process of insulating a coil which comprises wrapping fibrous material around the conductors, placing the wrapped conductor in a container in which a partial vacuum is maintained, heating the coil to expel moisture and air, forcing an impregating solution comprising a solution of a gum in a vegetable drying oil over the coil, maintaining the impregnating solution in contact with the coil, under pressure of a nonoxidizing gas, for a sufficient length of time to thoroughly impregnate the coil, removing the impregnating solution and draining the conductors at an elevated temperature in the atmosphere of the nonoxidizing gas.

7. In the process of insulating coils, the steps which comprise treating the coils with a solution of a gum in a vegetable drying oil at an elevated temperature under pressure of a nonoxidizing gas, removing the treating solution and draining at an elevated temperature in the nonoxidizing gas.

8. In the process of insulating electrical conductors, the steps which comprise wrapping the conductors with a fibrous material and impregnating the conductors with a solution of a gum in a vegetable drying oil.

In testimony whereof, I have hereunto subscribed my name this 19th day of September, 1930.

JAMES T. GOFF.